(12) United States Patent  (10) Patent No.: US 9,558,138 B2
Davies  (45) Date of Patent: Jan. 31, 2017

(54) COMPUTING SYSTEM WITH UNIFIED STORAGE, PROCESSING, AND NETWORK SWITCH FABRICS AND METHOD FOR MAKING AND USING THE SAME

(71) Applicant: Palo Alto Research Center Incorporated, Palo Alto, CA (US)

(72) Inventor: Daniel Davies, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 302 days.

(21) Appl. No.: 14/313,922

(22) Filed: Jun. 24, 2014

(65) Prior Publication Data

US 2015/0370740 A1   Dec. 24, 2015

(51) Int. Cl.
*G06F 13/40* (2006.01)
*G06F 13/22* (2006.01)

(52) U.S. Cl.
CPC .......... *G06F 13/4022* (2013.01); *G06F 13/22* (2013.01)

(58) Field of Classification Search
CPC .............. G06F 13/4063; G06F 13/4022; G06F 13/4009; H04L 12/40091; H04L 12/40097; H04L 2012/561
See application file for complete search history.

(56) References Cited

U.S. PATENT DOCUMENTS

| | | | |
|---|---|---|---|
| 6,018,782 A * | 1/2000 | Hartmann | G06F 15/7842 709/251 |
| 2005/0271035 A1* | 12/2005 | Cohen | H04L 12/18 370/351 |
| 2012/0219011 A1* | 8/2012 | Lu | H04L 12/66 370/419 |

* cited by examiner

Primary Examiner — Farley Abad
(74) Attorney, Agent, or Firm — Patrick J.S. Inouye; Krista A. Wittman

(57) ABSTRACT

A system and method for making and using a computing system with unified storage, processing, and network switch fabrics are provided. Processing nodes, either physical or virtual, are associated with intra-module ports, inter-module ports, and local storage spaces. A plurality of processing nodes are linked through intra-module ports to form processing modules. A plurality of the processing modules are further connected through inter-module ports to form the computing system. Several inter-module connection schemes are described, each of which can be adapted to use with existing network packet routing algorithms. Each processing node need only to keep track of the states of its directly connected neighbors, obviating the need for a high-speed connection to the rest processing nodes within the system. As a result, dedicated network switching equipment is not needed and network capacity grows naturally as processing nodes are added.

18 Claims, 4 Drawing Sheets

COMPUTING SYSTEM WITH UNIFIED STORAGE, PROCESSING, AND NETWORK SWITCH FABRICS AND METHOD FOR MAKING AND USING THE SAME

FIELD

This application relates in general to computing systems used in datacenters and, in particular, to a system and method for making and using unified storage, processing, and network switch fabrics.

BACKGROUND

Datacenters have experienced rapid growths, and the growth rate is expected to accelerate. The torrid development is fueled by an increasing demand, and made possible by reduced costs of the components of datacenters. Datacenter are chiefly constructed from processing nodes, storage nodes, and networks that connects the processing nodes and the storage nodes. Both the processing nodes and the storage nodes have become smaller, less expensive, and more energy efficient, allowing datacenters to pack more processing and storage nodes into smaller spaces to meet the increasing demand for data processing and storage. As the processing nodes consume more and more data at higher rates, and retrieve and store the data from and into storage nodes, the networks must transmit more and more data at higher speeds between increasing numbers of connections. As a result, the costs of the networks have become significant, in relationship to the falling costs of the processing and storage nodes. One estimate puts the cost of the networks at ~50% of new datacenters.

In a traditional datacenter, processing nodes are typically connected via a single primary network. Secondary networks, if any, are primarily used for administrative purpose and is not a topic of discussion here. Each processing node may have one or more locally attached long term storage devices such as hard disks or solid state disks. A processing node accesses its long term storage device to satisfy its internal needs and often on behalf of a system-wide distributed storage system. A number of processing nodes, each with one or more long term storage devices are packaged in a processing module. The computing power of the datacenter is scaled up primarily by adding processing modules. This construction framework places a heavy demand on the primary high-speed network, since every processing node added relies on the primary high-speed network to communicate with existing processing nodes. The capacity of the high-speed network has to increase in proportion to the numbers of processor nodes added. Because processing nodes are becoming faster and less expensive, while fast connectivity is getting more expensive, high-speed network costs have become the bottleneck that impedes the scaling up of datacenter computing capacity at low cost.

Facebook has set out the Open Compute Project, aiming to develop datacenter servers that are both energy- and cost-efficient. The solutions that the Open Compute Project promotes includes vanity-free design of hardware, open vault storage building blocks, mechanical mounting system, and high disk densities. The result of these efforts are datacenters made of vanity-free servers that are up to 38% more energy-efficient and up to 24% less expensive to build and run than traditional server hardware. However, the solutions practiced in the Open Compute Project amounts to optimization of packing processor nodes. The fundamental dichotomy between a processing function and a storage function, along with the resulting network traffic between the processing nodes that dedicated to computing and storage devices dedicated for storage, remains unchanged.

Nutanix has developed Nutanix Virtual Computing Platform that incorporates a high speed storage (Server Flash) and low speed storage (Hard Disk Storage) locally to processing nodes, to increase the speed and efficiency of computing for datacenters. However, no fundamental network improvement is revealed.

Thus there remains a need for keeping the demand for fast connectivity in datacenter at bay while adding more processing nodes to accommodate the ever-increasing need for more computing power. Preferably, when new processing nodes are added into an existing computer system, the new processing nodes contain their networking functionality and do not require dedicated network equipment to be installed, so that computing power and network capacity grow along with the addition of the processing nodes.

SUMMARY

A system and method for making and using a computing system with unified storage, processing, and network switch fabrics are provided. Processing nodes, either physical or virtual, are associated with intra-module ports, inter-module ports, and local storage devices. A plurality of processing nodes are linked through intra-module ports to form processing modules. A plurality of the processing modules are further connected through inter-module ports to form the computing system. Several inter-module connection schemes are described, each of which can be adapted to use with existing network packet routing algorithms. Each processing node need only to keep track of the states of its directly connected neighbors, obviating the need for a high-speed connection to the rest processing nodes within the system. As a result, dedicated network switching equipment is not needed and network capacity grows naturally as processing nodes are added.

One embodiment provides a computing system with a unified storage, processing and network switching fabrics. A processing module is made up from a plurality of the processing nodes, each processing node is connected to all remaining ones of the processing nodes within the module in which that processing node is comprised, to form an intra-module network. A plurality of processing nodes are implemented with intra-module ports, each of the intra-module ports is associated with one of the processing nodes. The plurality of processing nodes are also implemented with inter-module ports, each of the inter-module ports is associated with one of the processing nodes. The computing system is made up from a plurality of the processing modules, connected through an inter-module network comprising at least one connection between one of the inter-module ports on one of the processing modules to another of the inter-module ports on another processing modules.

A further embodiment provides a system for making and using a computing system with a unified storage, processing and network switching fabrics, including obtaining a plurality of processing modules, each comprising a plurality of processing nodes, each processing node is connected to all remaining ones of the processing nodes within the module in which that processing node is comprised, to form an intra-module connection; obtaining, for the processing node, an inter-module port; for each of the inter-module ports, determining, for the purpose of making an inter-module connection, another one of the processing nodes in the processing module different from the processing module in which that processing node is comprised; and establishing the inter-module connection based upon the determination.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Infrastructure

Figure 1:
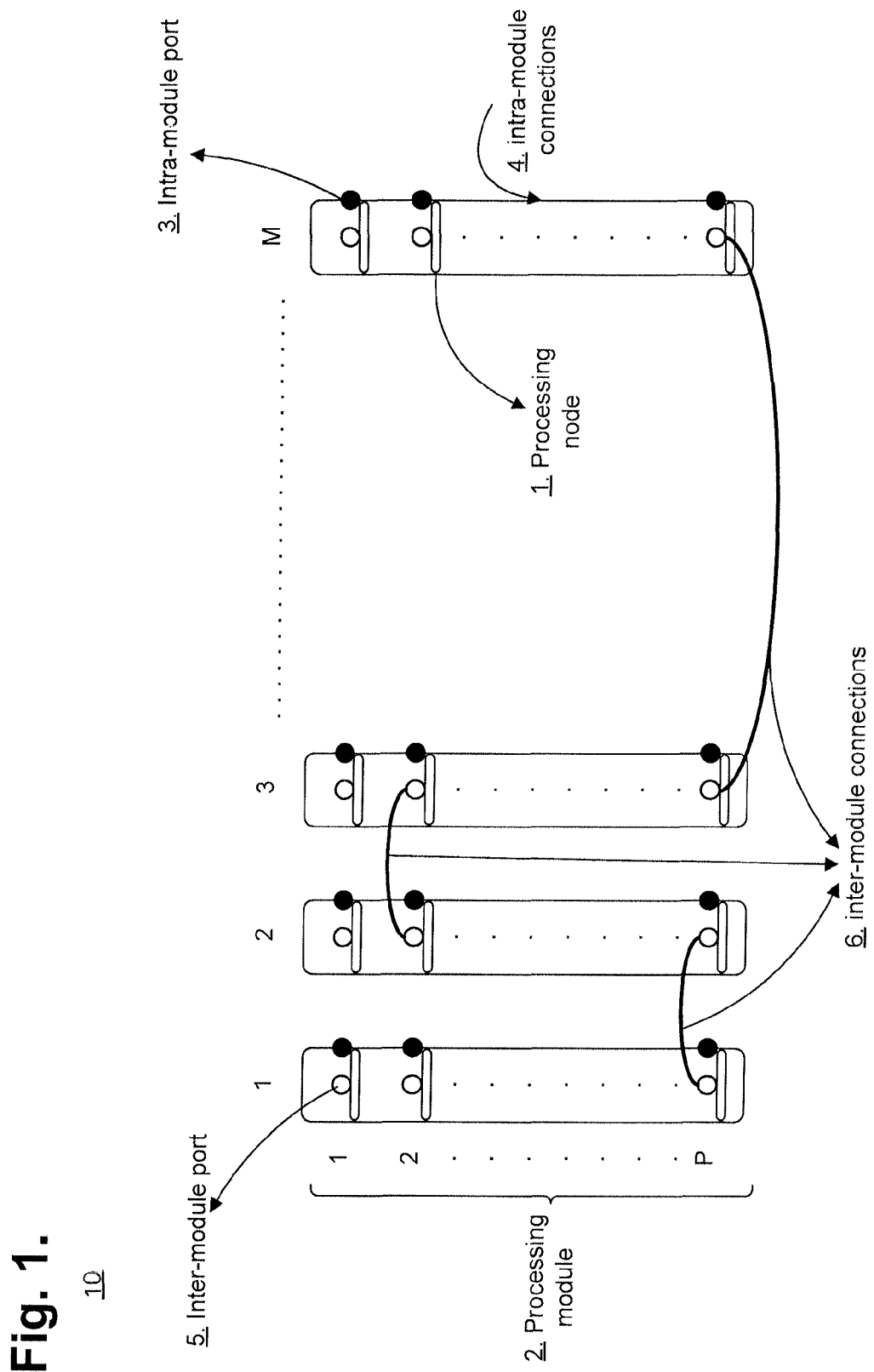
FIG. 1 is a block diagram showing a computing system with unified storage processing and network switching fabrics in accordance with one embodiment.

In one embodiment, a computing system incorporates multiple processing nodes organized in a two-level structure. At the first level, a plurality of processing nodes forms a processing module; at the second level, a number of processing modules forms the computing system. FIG. 1 is a block diagram showing a computing system (10) with unified storage processing and network switching fabrics in accordance with one embodiment.

A processing node (1) may be a physical node or a virtual node. In one embodiment, a physical node may implement several virtual nodes. In the following description, a processing node refers to both a physical node and a virtual node.

A processing node (1) can be comprised of a processing element, a memory controller, a memory, a storage controller, one or more storage devices, and interfaces to intra-module and inter-module ports. In a physical processing node, these are physical devices. In a virtual processing element, the functions of these devices are emulated. Every node has a unique network address. A processing node (1) typically is connected to its own storage device, which may satisfy the internal needs of the processing node or serve on behalf of a system-wide distributed storage system.

A plurality of processing nodes make up a processing module (2). Each processing node (1) is typically equipped with a high-speed data transfer port termed an intra-module port (3). Each processing node in a processing module is typically connected to each and every other processing node within the same processing module via the intra-module port (3). These connections within one processing module through intra-module ports are termed intra-module connections (4). The intra-module connections (4) allow the exchange of data packets between two processing nodes within the same processing module to be completed by one step. In one embodiment, the intra-module ports are PCI Express or Serial RapidIO. In a further embodiment, the intra-module connections are effected by using at least one of any technology and topology including a bus, a ring, a star, a mesh and a collection of one or more crossbar switches.

In additional to the intra-module port (3), a processing node may also be equipped with a networking port, termed inter-module port (5), that connects to another processing node located in another processing module via another inter-module port. These connections between two processing modules via two inter-module ports located on two processing nodes from two separate processing modules, respectively, are termed inter-module connection (6). Data packets may be sent from one processing module to another processing module in one step when the two processing modules are directly connected via an inter-module connection. In one embodiment, the inter-module ports are conventional networking ports such as Ethernet. In a further embodiment, the inter-module networking ports are physically accessible from outside the module.

Thus the computing system (10) includes a plurality of processing modules, inter-connected through a network of inter-module connections effected through inter-module ports. The processing modules in turn include a number of intra-connected processing nodes. In one embodiment, one processing node carries one inter-module port, and one inter-module port makes one inter-module connection, thus a processing module typically makes a limited number of inter-module connections, not exceeding the number of inter-module ports. The system thus constructed alleviates the pressure for high-speed traffic within the computing system as the number of processing nodes grow, since a processing node does not connect directly to and keep track of all the other processing nodes within a primary network; instead, each processing node need only to keep track of the states of its directly connected neighbors, Connection Schemes Examples of inter-module connection schemes are described infra. These examples are illustrative and not meant to be limiting. Other configurations, topologies, arrangements, and permutations of connections, ports and processing modules are possible, as would be recognized by one skilled in the art.

To facilitate the illustration, the following examples assume a computing system that includes M processing modules, with each processing module having P inter-module ports, with M and P both are integers. If P equals to zero, there are no connections between processing modules. Such a system has a severely limited utility. When P equals to 1, the system would include pairs of linked modules. Such a system has marginally greater utility than having entirely unlinked processing modules in that two modules might be more effective than one when working on an assignment. When P is greater than 1, the system can form a large network of linked processing modules and is more advantageous. The computing system's advantage in transfer data packet increases when the number of inter-module connections increase.

In general, the number of inter-module ports associated with each module does not need to be equal. Each inter-module port is associated with one processing node, and each inter-module port is either disconnected, or connected to another inter-module port on another processing module. For example, a computing system may have M processing modules, with each processing modules having a minimum of P inter-module ports. In such a system, the inter-module ports beyond P may remain unconnected, or connected to other inter-module ports.

Randomly Connecting Inter-Module Ports on One Processing Module to Inter-Module Ports on Other Processing Modules.

In one embodiment, inter-module ports located on one processing module are randomly connected to inter-module ports located on other processing modules. The advantage of this scheme is the simplicity, therefore low cost, of manufacture and maintenance. The disadvantage of this scheme is the risk that some processing modules may be disconnected whereas some other processing modules may be over-connected due to the random nature of forming the connections. However, the same randomness also ensures that when the number of processing modules are large, as they tends to be in a modern datacenter setting, there will not be a severe problem arising from over- and under-connection of the processing modules. According to the Law of Large Numbers, the average of the results obtained from a large number of trials of the same experiment should be close to the expected value, and will tend to become closer as more trials are performed. Thus, as M increases, the average number of connections from one processing node to another processing node under this scheme will approach P.

In a further embodiment, the number of inter-module ports in each of the processing module might be different. In still a further embodiment, some of the inter-module ports are disconnected.

Using a Binary Spanning System to Connect Inter-Module Ports on One Processing Module to Inter-Module Ports on Other Processing Modules.

In one embodiment, a binary spanning system is used to connect an inter-module port located on one processing module to an inter-module port located on another processing module. Under this scheme, the processing modules, whose number M is a power of 2, are first divided into M/2 groups, resulting in two processing modules/per group. Within each of the M/2 groups, the two processing modules are connected via their first inter-module ports. Next, the processing modules are divided into M/4 groups, with four processing modules/per group. Within each of the M/4 groups, the four processing modules are connected, 1 to 3, and 2 to 4, respectively, via their second inter-module ports. Next, the processing modules are divided into M/8 groups, with eight processing modules/per group. Within each of the M/8 groups, the eight processing modules are connected, 1 to 5, 2 to 6, 3 to 7, and 4 to 8, respectively, via their third inter-module ports. The connections are continuously built up in such a pattern until the number of inter-module ports used reaches P or $\log_2 M$, whichever is smaller.

Figure 2:
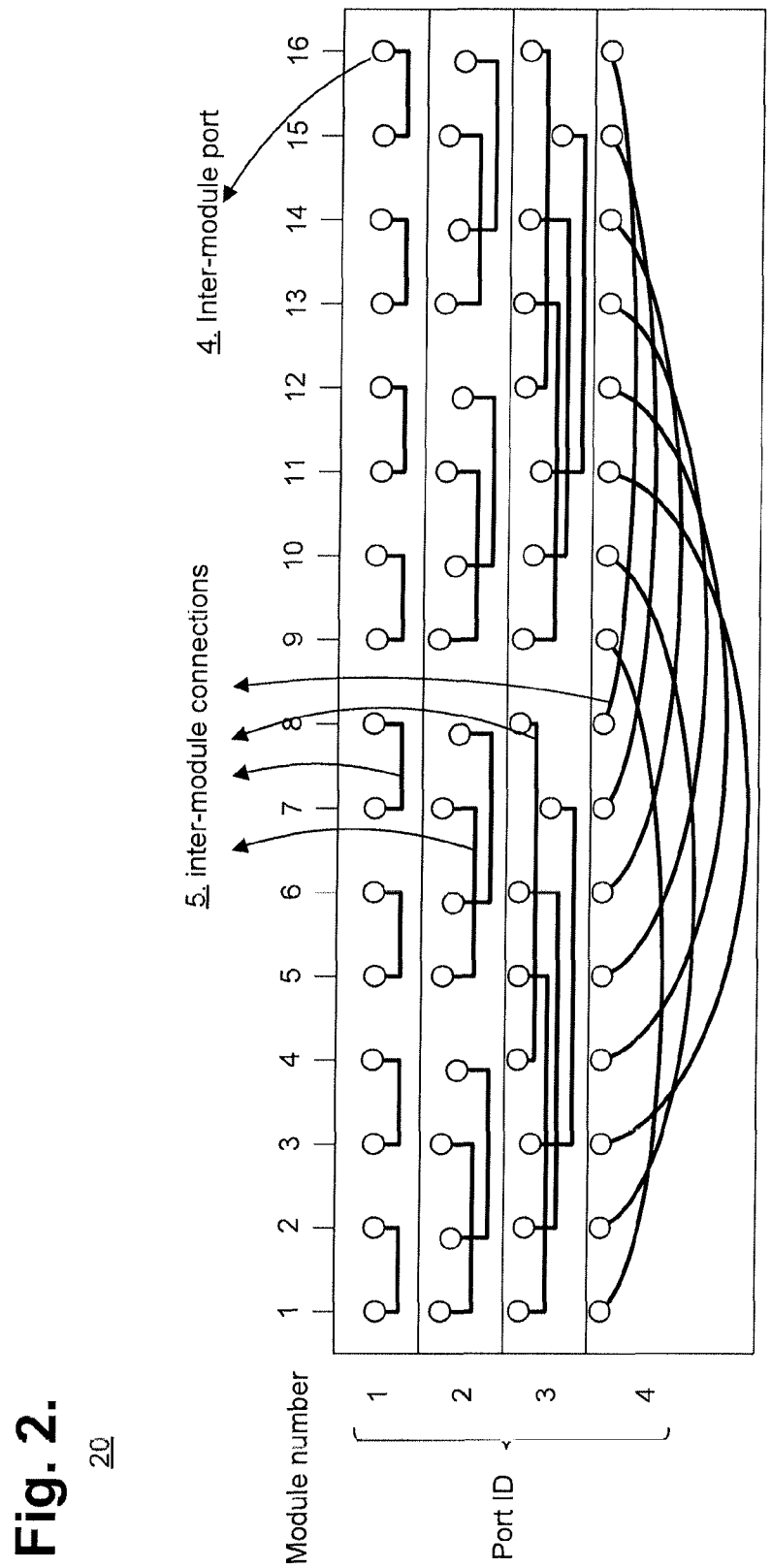
FIG. 2 is an illustration showing, by way of example, a binary spanning connection scheme, illustrated as a computing system that includes 16 processing modules (M=16) with 4 inter-module ports (P=4) on each of the processing modules.

This binary spanning is better illustrated through an example. FIG. 2 is an illustration showing, by way of example, a binary spanning connection scheme (20), illustrated as a computing system that includes 16 processing modules (M=16) with four inter-module ports (P=4) on each of the processing modules. The processing modules are abbreviated to modules 1, 2, . . . , and 16. The inter-module ports are numbered 1, 2, 3, and 4. The person skilled in the art can appreciate that the number of processing modules and inter-module connection ports are for illustrative purpose only and not limiting. Other numbers of M and P are possible. In each of the M modules, there are various numbers of processing nodes that are connected through intra-module connections.

Thus, under the binary spanning scheme, the following pairs of the processing modules are connected via inter-module ports 1: 1 to 2, 3 to 4, 5 to 6, 7 to 8, 9 to 10, 11 to 12, 13 to 14, and 15 to 16 (FIG. 2); the following pairs of processing modules are linked via inter-module ports 2: 1 to 3, 2 to 4, 5 to 7, 6 to 8, 9 to 11, 10 to 12, 13 to 15, and 14 to 16 (FIG. 2); the following pairs of processing modules are linked via inter-module ports 3: 1 to 5, 2 to 6, 3 to 7, 4 to 8, 9 to 13, 10 to 14, 11 to 15, and 12 to 16 (FIG. 2); finally, the following pairs of processing modules are linked via inter-module port 4: 1 to 9, 2 to 10, 3 to 11, 4 to 12, 5 to 13, 6 to 14, 7 to 15, and 8 to 16 (FIG. 2).

Thus, the binary spanning scheme can be generalized as a system with M processing modules and P or more inter-module ports in each processing modules. Each port is associated with exactly one processing node. M is a power of 2. The inter-module connections are implemented according to the following rule:

i. Port 1 on module 2N+1 is connected to Port 1 on module 2N+2, where N is [0, 1, . . . , (M/2)−1].

ii. Ports 2 on modules 4N+1 and 4N+2 are connected to Ports 2 on modules 4N+3 and 4N+4, respectively, where N is [0, 1, . . . , (M/4)−1].

iii. In general, Ports P on modules $(2^P*N+1)$ through $(2^P*N+2^{P-1})$ are connected to Ports P on modules $(2^P*N+2^{P-1}+1)$ through $(2^P*N+2^P)$, respectively, where N is [0, 1, . . . , $(M/2^{P+1})-1$], and P is [1, 2, . . . , P].

Thus, the binary spanning system represents a connecting scheme where all processing modules are first connected pairwise via the first inter-module ports; subsequently each of the pairs is further paired up with another pair to form a pair of pair via the second inter-module ports; and the pairing continues until unused inter-module ports are exhausted or when all the processing modules are paired up into one pair. Accordingly, in one embodiment, the connection among the processing modules are made by: 1, pairing one of the processing modules with another one of the processing modules and connecting the paired processing modules to form a connected pair via inter-module ports on the processing nodes within the paired processing modules; 2, pairing one of the connected pair with another one of the connected pair and connecting the pairs to form a further connected pair via unused inter-module ports on the further connected pairs; and 3, further pairing and connecting the further connected pairs, until all of the inter-module ports have been utilized, or all processing modules are connected.

When P, the number of inter-module ports, equals to $\log_2 M$, the computing system may be fully connected, that is, each processing-module is connected another processing module, either directly or indirectly. The number of total connections equals to (M*P)/2.

When P is smaller than $\log_2 M$, the computing system will not be fully connected. For example, when P equals to $\log_2 M-1$, the computing system will comprise of two halves, each halve is internally connected but does not connect to the other half. When P equals to $\log_2 M-2$, the computing system will comprise of four quadrants, each quadrant is internally connected but does not connect to the other quadrants. When P equals to $\log_2 M-3$, the computing system will split into eight equal sections of internally connected aggregates of processing modules. Because the computing system's power generally increases when the processing modules are better connected, it is advantageous to have a P number close to $\log_2 M$.

When P is larger than $\log_2 M$, the computing system may be fully connected using the $\log_2 M$ number of the inter-module ports, and the remaining inter-module ports, by the number of P−$\log_2 M$ per processing module, can either remain unconnected or form additional connections among the inter-module ports. In one embodiment, additional connections are randomly formed within the computing system. In a further embodiment, additional connections are formed by two computing systems that are connected by the binary spanning system In a further embodiment, the number of inter-module ports in each of the processing modules might be different from one another. The binary spanning system does not require the number of inter-module ports being equal among the processing modules. In one embodiment, the numbers of inter-module ports are different among the processing modules in a binary spanning system can still be implemented by identifying the smallest number of the inter-module ports on the processing modules within a computing system, and assigning the smallest number as the number of the inter-module ports for all the processing modules within the computing system.

Using a Ring System to Connect Inter-Module Ports on One Processing Module to Inter-Module Ports on Other Processing Modules.

A ring system is a connection scheme that has the common feature of connecting all the processing modules in the computing system in a series of linearly connected processing modules with the beginning and the end of the series further linked to each other to form a closed circle, or ring, using two inter-module ports from each of the connected processing modules. A connection system in which every module utilizes exactly two ports, one connecting to the previous module and one connecting to the next module, is termed a basic ring system. A basic ring system may be modified by introducing additional connections between the processing modules residing on the ring. A ring system, unless specified, refers to both the basic and the modified ring systems, as described infra.

Figure 3:
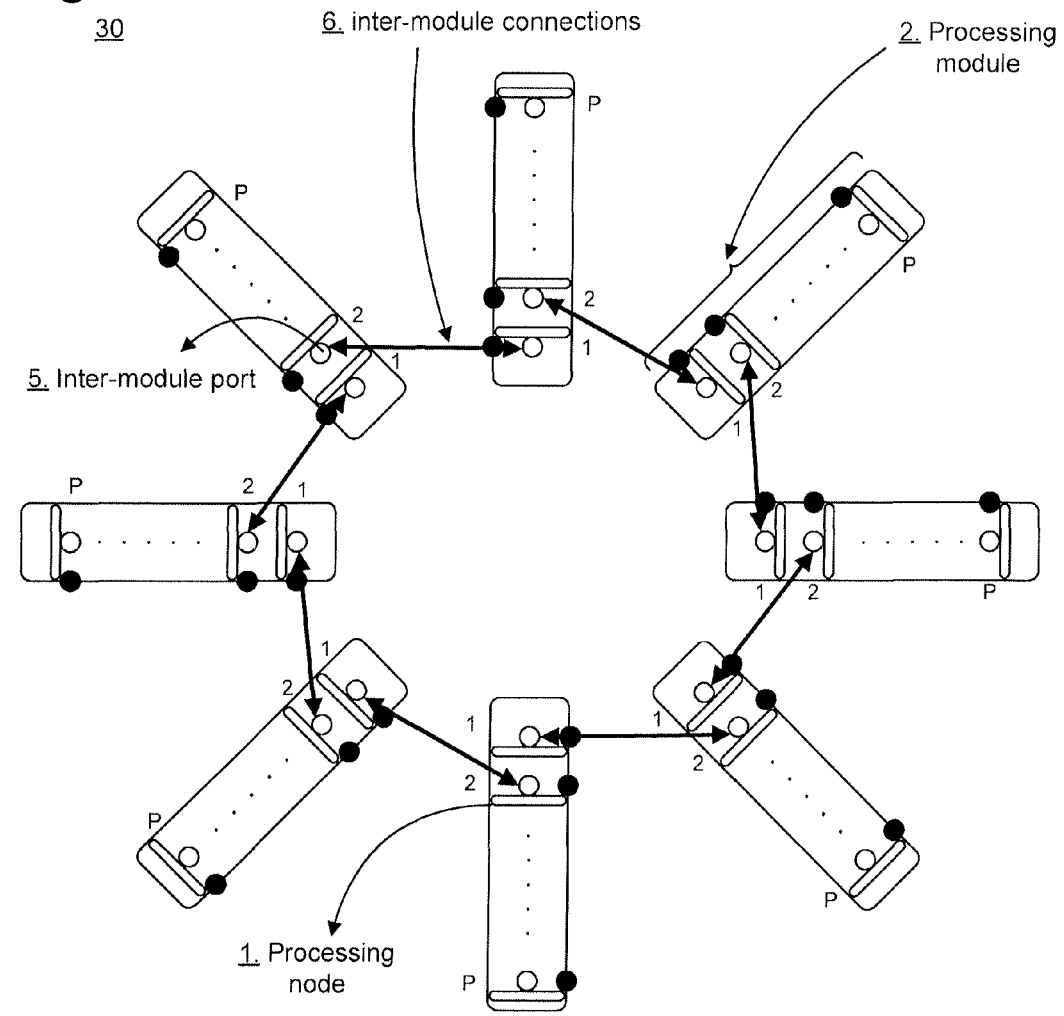
FIG. 3 is an illustration showing, by way of example, a ring system connection scheme, illustrated as a computing system that includes 8 processing modules (M=8).

The Basic Ring system. In one embodiment, inter-module ports located on one processing modules are connected to inter-module ports located on other processing modules using a ring system. FIG. 3 is an illustration showing, by way of example, a ring system (30) connection scheme, illustrated as a computing system that includes eight processing modules (M=8). In a computing system that includes M processing modules, the ring system is implemented by connecting inter-module port 1 on processing module N to inter-module port 2 on processing module N+1 for N in [1, 2, . . . , M−1], and the inter-module port 1 on the processing module M to the inter-module port 2 of the processing module 1. The port number or the module number can be trivially swapped without deviating from the ring system. Thus, using two inter-module ports per processing module, the ring system linearly connects all the processing modules in the computing system in a head-to-tail fashion, and closes the linear sequence into a circle by linking the last processing module to the first processing module. This scheme has the advantage of connecting together all the processing modules within a computing system using only two inter-module ports per processing module. However, since the number of the processing modules in a system tends to be large, the number of hops to travel from one processing module to another in a basic ring system may be large (the maximum number of hops is M/2). A large number of hops leads to long latencies. This problem can be alleviated by introducing further connections within the ring of processing modules, as further described infra.

Figure 4A:
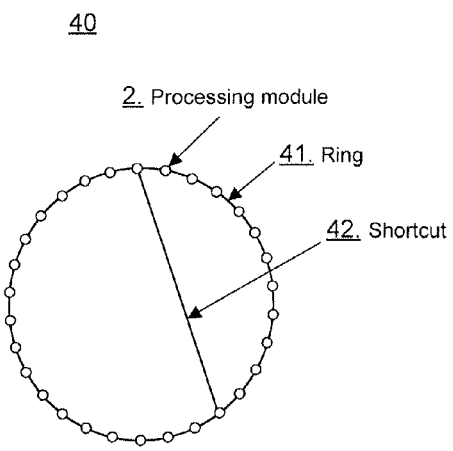
FIG. 4a is an illustration showing, by way of example, a ring system connection scheme with a shortcut.

The Ring System with Shortcuts. In a further embodiment, a computing system is implemented with a basic ring system. Furthermore, a connection is made between two processing modules on the ring and not adjacent to each other, via one inter-module port located on one of the two processing modules and not used for the linear connection, to another inter-module port located on the other of the two processing modules and not used for the linear connection. FIG. 4a is an illustration showing, by way of example, a ring system connection scheme with shortcut (40). On the ring (41) formed by linearly connected processing module (2), two non-adjacent processing modules is connected via inter-module connection to form a short cut (43). The shortcut (43) may cut down the latencies for some; however, the shortcut (43) may or may not match the data packet traffic patterns well.

In one embodiment, the shortcuts are formed randomly. In another embodiment, multiple shortcuts are formed. In still another embodiment, the shortcuts are formed by choosing two processing modules in accordance to data traffic pattern. In still another embodiment, the shortcuts are amended by choosing two processing modules in accordance to data traffic pattern.

Figure 4B:
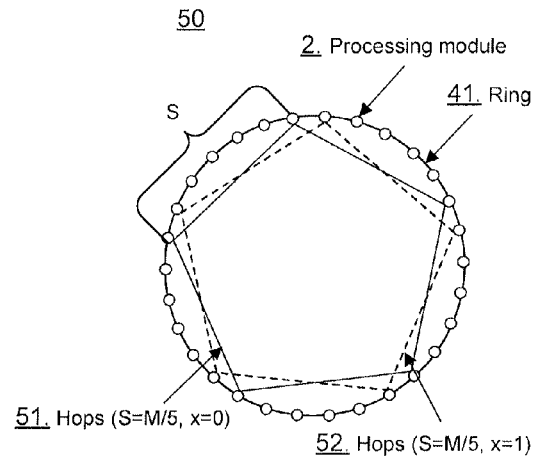
FIG. 4b is an illustration showing, by way of example, a ring system connection scheme with hops by the steps of S.

Ring System with Hops by the Steps of S. In a further embodiment, a computing system is implemented with a basic ring system with M processing modules. Furthermore, port P on processing module N is connected to port P+1 on processing module N+S where S is an integer divisor of M, N is [x, x+S, . . . , x+(M−S), increment by S], and x is [1, 2, . . . , S−1]. These connections allows data packets to travel around the ring in steps of size S. FIG. 4b is an illustration showing, by way of example, a ring system connection scheme with hops by the steps of S (50). For illustration purposes, a five-step hop is shown (51). S, the size of the steps, equal to M/5. The pentagon with solid lines (51) represents the five-step hops with x equals to zero. The pentagon with dotted lines (52) represents the five-step hops with x equals to 1. All values of x need not be used. The more values of x are used, the more hops are created and potential bottlenecks are further reduced, but the fewer ports are available for other shortcuts.

Figure 4C:
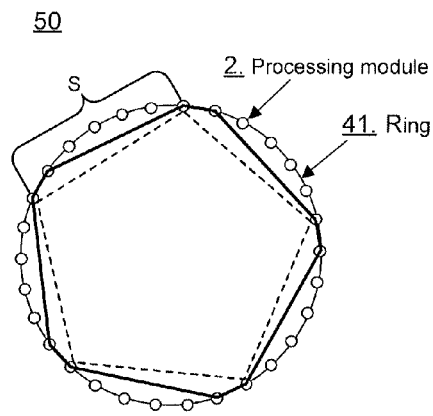
FIG. 4c is an illustration showing, by way of example, a ring system connection scheme with split hops by the steps of S.

Ring System with Split Hops by the Steps of S. In a further embodiment, a computing system is implemented with a basic ring system with M processing modules. Furthermore, port P on module N is connected to port P on module N+S−1 where S is an integer divisor of M, the number of modules, N is [x, x+S, . . . , x+(M−S), increment by S], and x is [0, 1, . . . , M/S−1]. These connections allow data packets to travel around the ring in pairs of steps of length S−1 and 1, respectively. FIG. 4c is an illustration showing, by way of example, a ring system with split hops by the steps of S. For illustration purpose, a five-step split hops are shown. S, the size of the steps, equal to M/5. The solid straight lines represent the first of the split hop, at the size of S−1. The second of the split hop is along the ring and at the size of 1. The pentagon with dotted lines represents a resulting hops through the split steps. The connection scheme has the advantage of only using one port on each module by taking advantage of the ring constructed with ports 1 and 2.

Ring System with Adjustable Split Hops by the Steps of S. In a further embodiment, a computing system is implemented with a basic ring system with M processing modules.

Figure 4D:
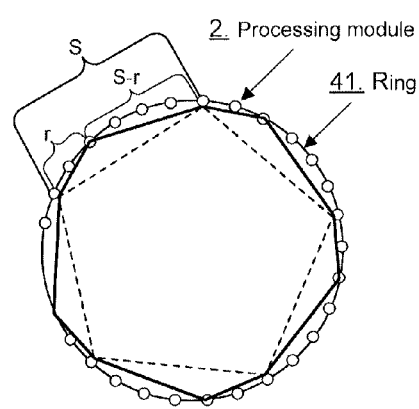
FIG. 4d is an illustration showing, by way of example, a ring system connection scheme with adjustable split hops by the steps of S.

Furthermore, port P on module N is connected to port P on module N+S−r where S is an integer divisor of M, N is [x, x+S, . . . , x+(M−S), increment by S], and x is [0, 1, . . . , M/S−1]. These connections allows data packets to travel around the ring in pairs of steps of length S−r and r, respectively. FIG. 4d is an illustration showing, by way of example, a ring system with adjustable split hops by the steps of S. For illustration purpose, a five-step hop is shown. S, the size of the steps, equal to M/5. The pentagon with dotted lines represents a would-be hops by the steps of S. The straight line represents the S−r hop and the r hop, together the S−r hop and the r hop forms the adjustable split hop by the steps of S. r is an integer with value of 1<r<S. The connection scheme has the advantage of only using one port on each module by taking advantage of the ring constructed with ports 1 and 2.

Using a Hybrid System to Connect Inter-Module Ports on One Processing Module to Inter-Module Ports on Other Processing Modules. In one embodiment, inter-module ports located on one processing modules are connected to inter-module ports located on other processing modules using a hybrid system. A hybrid system refers to a combination of two of more connection schemes. In a further embodiment, processing modules are divided into a number of blocks, each of which is connected internally using a binary spanning system. The blocks are connected using a ring system that uses inter-module ports that were not used for the internal connections within the blocks. In still a further embodiment, the blocks of the processing modules may be installed inside a rack or a set of racks. Finally, in a further embodiment, the established inter-module connections include at least one of a random connection, a binary spanning system, a ring system, a hybrid system, and a combination thereof.

Using a Tuned System to Connect Inter-Module Ports on One Module to Inter-Module Ports on Other Modules.

The connection schemes described supra may be further improved or modified by using a tuned system. In one embodiment, a computing system performs a task or an assignment that requires transferring a data packet from one processing node to another processing node through the established inter-module connections. A data packet traffic pattern is measured, traffic bottleneck is identified, and inter-module connections are amended based upon the packet traffic pattern to optimize the traffic flow.

The connection schemes and network topologies described can be adapted to network packet routing algorithms, including adaptive routing algorithm, non-adaptive routing algorithm, delta routing, multipath routing, and hierarchical routing.

While the invention has been particularly shown and described as referenced to the embodiments thereof, those skilled in the art will understand that the foregoing and other changes in form and detail may be made therein without departing from the spirit and scope of the invention.

What is claimed is:

1. A computing system with a unified storage, processing and network switching fabrics, comprising:
a plurality of processing nodes;
a plurality of intra-module ports, each of the intra-module ports is associated with one of the processing nodes;
a plurality of inter-module ports; each of the inter-module ports is associated with one of the processing nodes;
a plurality of processing modules each comprising at least one of the processing nodes, each processing node is connected to all remaining ones of the processing nodes within the module in which that processing node is comprised, to form an intra-module network; and
an inter-module network comprising at least one connection between one of the inter-module ports on one of the processing modules to another one of the inter-module ports on another one of the processing modules, wherein the inter-module network comprises connections provided according to the method of connecting an inter-module port P on the processing modules $(2^P*N+1)$ through $(2^P*N+2^{P-1})$ to a further inter-module port P on the processing modules $(2^P*N+2^{P-1}+1)$ through $(2^P*N+2^P)$, respectively, where N is $[0, 1, \ldots, (M/2^P)-1]$, and P is $[1, 2, \ldots, P]$, wherein the number of the processing modules is M and each of the processing modules has at least P inter-module ports.

2. A system according to claim 1, wherein the intra-module connection network comprises at least one of:
a bus, a ring, a star, a mesh, and a crossbar switch.

3. A system according to claim 1, wherein the processing nodes each comprise at least one of:
a physical node and a virtual node.

4. A system according to claim 1, wherein the processing nodes each comprise at least one of:
a processing element, a memory controller, a memory, a storage controller, a storage device, and interfaces to intra-module and inter-module ports.

5. A system according to claim 1, further comprising:
a further inter-module network comprising a series of linearly connected processing modules with the beginning and the end of the series further linked to each other to form a ring, using two inter-module ports from each of the connected processing modules.

6. A system according to claim 5, further comprising:
a connection between two non-adjacent processing modules on the ring, via one inter-module port located on one of the two processing modules and not used for the linear connection, to another inter-module port located on the other of the two non-adjacent processing modules and not used for the linear connection.

7. A system according to claim 5, further comprises at least one of:
a connection between a processing module N on the ring to processing a module N+S on the ring, by connecting one unused inter-module port on the processing module N to another unused inter-module port on the processing module N+S, wherein M is the number of the processing modules on the ring, S is an integer divisor of M, N is [x, x+S, . . . , x+(M−S), increment by S], and x is [1, 2, . . . , S−1];
a connection between a processing module N on the ring to processing a module N+S−1 on the ring, by connecting one unused inter-module port on the processing module N to another unused inter-module port on the processing module N+S−1, wherein M is the number of the processing modules on the ring, S is an integer divisor of M, N is [x, x+S, . . . , x+(M−S), increment by S], x is [1, 2, . . . , S−1]; and
a connection between a processing module N on the ring to a processing module N+S−r on the ring, by connecting one unused inter-module port on the processing module N to another unused inter-module port on the processing module N+S−r, wherein M is the number of the processing modules on the ring, S is an integer divisor of M, N is [x, x+S, . . . , x+(M−S), increment by S], x is [1, 2, . . . , S−1], and r is [2, 3, . . . , S−1].

8. A system according to claim 1, further comprising:
a transmission module to transfer data packet from one of the processing nodes to another one of the processing nodes through the established inter-module connection.

9. A system according to claim 8, further comprising:
a monitoring module measuring the data packet traffic pattern; and
a modification module to amend the established inter-module connection based upon the packet traffic pattern.

10. A method of making or using a computer system with a unified storage, processing and network switching fabrics, comprising the steps of:
providing a plurality of processing modules, each comprising a plurality of processing nodes, each processing node is connected to all remaining ones of the processing nodes within the module in which that processing node is comprised, to form an intra-module connection;
providing, for at least one of the processing nodes, an inter-module port;
for each of the inter-module ports, determining, for the purpose of making an inter-module connection, another one of the processing nodes in the processing module different from the processing module in which that processing node is comprised; and
establishing the inter-module connection based upon the determination by establishing the inter-module connection between the processing modules, wherein the number of the processing modules is M and each of the processing modules has at least P inter-module ports, connecting a port P on the processing modules $(2^P*N+1)$ through $(2^P*N+2^{P-1})$ to a further port P on the processing modules $(2^P*N+2^{P-1}+1)$ through $(2^P*N+2)$, respectively, where N is $[0, 1, \ldots, (M/2^P)-1]$, and P is $[1, 2, \ldots, P]$.

11. A method according to claim 10, further comprising the step of:
forming the intra-module connection via at least of a bus, a ring, a star, a mesh, and a crossbar switch.

12. A method according to claim 10, further comprising the step of:
providing each of the processing nodes as one of a physical node and a virtual node.

13. A method according to claim 10, wherein each of the processing nodes comprises at least one of a processing element, a memory controller, a memory, a storage controller, a storage device, and interfaces to intra-module and inter-module ports.

14. A method according to claim 10, further comprising the steps of:
establishing a further inter-module connection, comprising:
linearly connecting a series of the remaining processing modules; and
connecting the beginning and the end of the series to form a ring;
wherein the connections are provided using two inter-module ports from each of the connected processing modules.

15. A method according to claim 14, further comprising the step of:
connecting one unused inter-module port on one of the processing modules on the ring to another unused inter-module port on another, non-adjacent processing module on the ring.

16. A method according to claim 14, further comprising at least one of the steps of:
providing a connection between a processing module N on the ring to a processing module N+S on the ring, by connecting one unused inter-module port on the processing module N to another unused inter-module port on the processing module N+S, wherein M is the number of the processing modules on the ring, S is an integer divisor of M, N is [x, x+S, . . . , x+(M−S), increment by S], and x is [1, 2, . . . , S−1];
providing a connection between a processing module N on the ring to a processing module N+S−1 on the ring, by connecting one unused inter-module port on the processing module N to another unused inter-module port on the processing module N+S−1, wherein M is the number of the processing modules on the ring, S is an integer divisor of M, N is [x, x+S, . . . , x+(M−S), increment by S], and x is [1, 2, . . . , S−1]; and
providing a connection between a processing module N on the ring to a processing module N+S−r on the ring, by connecting one unused inter-module port on the processing module N to another unused inter-module port on the processing module N+S−r, wherein M is the number of the processing modules on the ring, S is an integer divisor of M, N is [x, x+S, . . . , x+(M−S), increment by S], x is [1, 2, . . . , S−1], and r is [2, 3, . . . , S−1].

17. A method according to claim 10, further comprising the step of:
transferring a data packet from one of the processing nodes to another one of the processing nodes through the established inter-module connection.

18. A method according to claim 17, further comprising the steps of:
measuring the data packet traffic pattern; and
amending the established inter-module connection based upon the packet traffic pattern.

* * * * *